(12) United States Patent
Vlot

(10) Patent No.: US 7,477,324 B2
(45) Date of Patent: Jan. 13, 2009

(54) TRANSMISSION SYSTEM

(75) Inventor: Marnix Claudius Vlot, Eindhoven (NL)

(73) Assignee: Pace Micro Technology Plc, Saltaire, Shipley (GB)

( * ) Notice: Subject to any disclaimer, the term of this patent is extended or adjusted under 35 U.S.C. 154(b) by 893 days.

(21) Appl. No.: 10/500,757

(22) PCT Filed: Dec. 23, 2002

(86) PCT No.: PCT/IB02/05729

§ 371 (c)(1),
(2), (4) Date: Jul. 6, 2004

(87) PCT Pub. No.: WO03/058961

PCT Pub. Date: Jul. 17, 2003

(65) Prior Publication Data

US 2005/0135285 A1 Jun. 23, 2005

(30) Foreign Application Priority Data

Jan. 11, 2002 (EP) .................................. 02075075

(51) Int. Cl.
*H04N 5/38* (2006.01)
*H04N 5/46* (2006.01)
(52) U.S. Cl. .................. 348/723; 348/729; 348/473
(58) Field of Classification Search ................ 348/723, 348/473, 474, 729, 726, 465, 385.1, 725, 348/553–556; 375/240.1
See application file for complete search history.

(56) References Cited

U.S. PATENT DOCUMENTS 5,412,426 A * 5/1995 Totty ..................... 375/240.01
6,084,910 A * 7/2000 Stanger et al. ......... 375/240.03
6,215,815 B1 4/2001 Chen
2002/0138833 A1 9/2002 Kageyama

FOREIGN PATENT DOCUMENTS

WO   WO 88/01464 A1   2/1988
WO   WO 01/78272 A1   10/2001

OTHER PUBLICATIONS

"Scalable Video Transmission for the Internet" by Horn et al.

* cited by examiner

*Primary Examiner*—M. Lee
(74) *Attorney, Agent, or Firm*—Head, Johnson & Kachigian

(57) ABSTRACT

The invention relates to a transmission system (10) comprising a transmitter (12) and a receiver (14). The transmitter (12) is arranged for transmitting a plurality of signals (13), e.g. radio and/or television signals. The plurality of signals (13) comprise mutually corresponding signals, e.g. analog and digital signals of the same channel or program. Alternatively, the mutually corresponding signals may comprise standard definition and high definition signals of the same channel or program. The receiver (14) is arranged for receiving at least part of said plurality of signals (13). The transmitter (12) is arranged for transmitting information (15) identifying said mutually corresponding signals and the receiver (14) is arranged for receiving said information (15). The receiver (14) comprises a selector (16) for selecting on basis of said information (15) at least one (17) of the mutually corresponding signals. In the way, the receiver (14) can automatically select the most appropriate signal (17), e.g. for inclusion in a list of available channels/programs or for reproduction.

8 Claims, 1 Drawing Sheet

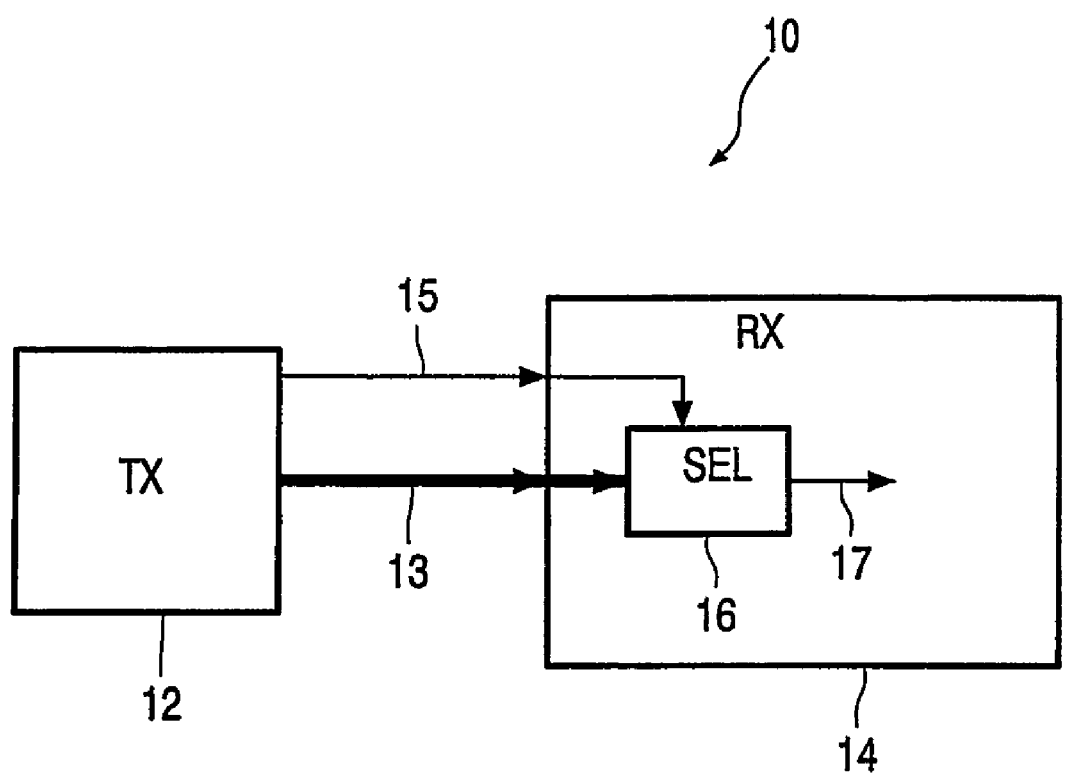

TRANSMISSION SYSTEM

The invention relates to a transmission system comprising a transmitter and a receiver, the transmitter being arranged for transmitting a plurality of signals, the plurality of signals comprising mutually corresponding signals, the receiver being arranged for receiving at least part of said plurality of signals.

The invention also relates to a transmitter for transmitting a plurality of signals, a receiver for receiving at least part of a plurality of signals, a method of transmitting a plurality of signals and to a method of receiving at least part of a plurality of signals.

The simultaneous transmission of mutually corresponding radio and/or television signals is sometimes referred to as simulcast. The mutually corresponding signals may be versions of the same channel/program according to two or more standards, e.g. PAL and DVB, which are transmitted simultaneously during a transition period between these standards. Alternatively, the mutally corresponding signals may be standard definition (SD) and high definition (HD) signals of the same channel/program.

Not every receiver may be able to receive or process, e.g. reproduce, all of the mutually corresponding signals. For instance, a standard definition television receiver in general can not receive and display high definition television programs. Modern receivers are arranged to prepare a list of available channels/programs for presentation to a user so that the user can select a desired channel/program. A problem with such a list is that it contains entries for all the mutually corresponding signals, which may include signals which cannot be received or processed by the receiver. The user thus finds channels/programs in the list which cannot be received or processed by the receiver.

It is an object of the present invention to provide a transmission system according to the preamble which does not suffer from the above mentioned problem. This object is achieved in the transmission system according to the invention, said transmission system being characterized in that the transmitter is arranged for transmitting information identifying said mutually corresponding signals and in that the receiver is arranged for receiving said information, the receiver comprising a selector for selecting on basis of said information at least one of the mutually corresponding signals. In this way the receiver can select automatically which of the mutually corresponding signals is best suited for inclusion in the list so that the user is only confronted with a single entry for each channel/program. The selection may also be based on the capabilities of the receiver or on the quality of the received signals. For instance, a high definition television signal may be transmitted with less power than the therewith corresponding standard definition television signal. In case of bad reception conditions the selector in a high definition television receiver may select the standard definition television signal.

The above object and features of the present invention will be more apparent from the following description of the preferred embodiments with reference to the drawing, wherein:

FIG. 1 shows schematically an embodiment of a transmission system 10 according to the invention.

FIG. 1 shows schematically an embodiment of a transmission system 10 according to the invention. The transmission system 10 comprises a transmitter 12 and a receiver 14. The transmitter 12 transmits a plurality of signals 13, e.g. radio and/or television signals, to the receiver 14. The plurality of signals 13 comprises mutually corresponding signals, e.g. analog and digital signals of the same channel or program. Alternatively, the mutually corresponding signals may comprise standard definition and high definition signals of the same channel or program. The receiver 14 receives at least part of the plurality of signals 13. The transmitter 12 transmits information 15 identifying said mutually corresponding signals, which information 15 is received by the receiver 14. The receiver 14 comprises a selector 16 for selecting on basis of said information 15 at least one 17 of the mutually corresponding signals, e.g. for inclusion in a list of available channels or programs. The selection by the selector 16 may also be based on capabilities of the receiver 14, e.g. the ability to reproduce only SD signals, and/or on a quality of the received signals 13.

By means of example the simulcast of mutually corresponding SD and HD video services and the information identifying these services will now be described in a DVB compliant system setting. DVB is a digital TV standard which is partly defined in the following document: ETSI EN 300468 "Digital Video Broadcasting (DVB) Specification for Service Information in DVB systems".

Two options are identified to create a simulcast situation for SD and HD video services:

The SD and HD services are in fact one DVB service and the two video components are carried as two alternative video components of a single service in a single transport stream. This is called the "Single Service Configuration Option".

The SD and HD services are two separate DVB services potentially carried in two different transport streams (be it on different frequencies and/or with a different geographical coverage e.g. using hierarchical modulation or just for bandwidth management reasons). This is called the "Multi Service Configuration Option".

Single Service Configuration Option:

This option requires that both SD and HD MPEG video elementary streams are part of a single service. In order to signal information identifying the mutually corresponding SD and HD video streams the components can be tagged with a component_descriptor in the EIT (Event Information Table) of the event that will describe the type of video component (SD or HD) (see table 12 of the above mentioned document). The corresponding video components can be tagged with a stream_identifier_descriptor in the PMT (Program Map Table) for that service (tag values matching the corresponding tag fields in the EIT).

Automatic selection of the appropriate video service can be handled by the receiver based on the EIT signaling, the type (SD and/or HD) stream available and the decoding capabilities of the receiver.

Multi Service Configuration Option:

Two signaling options are defined here to identify a service as being HD-only:

1. A new service type (carried in the service$_{13}$ descriptor in the SDT (Service Description Table) and optionally in the service_list_descriptor in the NIT (Network Information Table).

2. Linkage descriptor carried in the SDT. This alternative, provides more compatibility to "existing" HD receivers but is less backward compatible to SD receivers.

The Multi Service Configuration Option requires that two services (on the same network) with essentially the same content (in SD and HD format respectively) are available (probably on different multiplexes, but with identical network_ids). The equivalence of both services is signaled by using the same logical channel number (LCN, carried in the logical_channel_descriptor of the NIT for both services). Note: in order for the receiver to recognize the equivalence of the services it is essential that both are carried by the same network (i.e. are associated with the same network_id), but it is not essential that both are carried on the same transport stream. Services with the same LCN, different service_ids and different network_ids are considered to be regional variants.

Signaling Option 1: new service type:

The difference between the SD and the HD version of the service is indicated by the "service_type" field in the "service_descriptor" carried in the SDT (and if available, in the service_list_descriptor carried the NIT). For the SD version of the service, service type 0×01 (digital television) is used. For the HD version of the service, service type 0×81 can be used (user defined by DVB, meaning "digital HD video service with an equivalent SD service"). This definition allows SD receivers to ignore HD-only services in a fully backward compatible way, while HD receivers can easily disregard SD versions of the same service. It does require HD receivers to be aware of the new service_type however.

Signaling option 2: new linkage descriptor:

A new type of linkage_descriptor is introduced in the SDT: "SD service replacement link". The type_id used could be 0×90 (DVB user defined: meaning "SD replacement service link") or a regular DVB code (e.g. 0×12) could be applied for. It should be carried in the SDT for an HD service, pointing to the equivalent SD service. SD-only receivers can ignore services with this link and use the SD equivalent service pointed to by the link instead.

Following text applies to signaling option 1 and signaling option 2: HD receivers may store both versions of the service as options in their service list and select the SD service in case the reception quality of the HD service is poor. SD receivers can safely ignore HD-only services completely.

The scope of the invention is not limited to the embodiments explicitly disclosed. The invention is embodied in each new characteristic and each combination of characteristics. Any reference signs do not limit the scope of the claims. The word "comprising" does not exclude the presence of other elements or steps than those listed in a claim. Use of the word "a" or "an" preceding an element does not exclude the presence of a plurality of such elements.

The invention claimed is:

1. Transmission system comprising a transmitter and a receiver the transmitter being arranged for transmitting a plurality of signals, the plurality of signals comprising mutually corresponding signals, the receiver being arranged for receiving at least part of said plurality of signals the transmitter being arranged for transmitting information identifying said mutually corresponding signals and the receiver is being arranged for receiving said information the receiver comprising a selector for selecting on basis of said information at least one of the mutually corresponding signals based on the capabilities of the receiver to process only said selected at least one of the mutually corresponding signals for presentation to a user.

2. Transmission system according to claim 1, the plurality of signals comprises radio and/or television signals.

3. Transmission system according to claim 2, wherein the mutually corresponding signals relate to a same channel or program.

4. Transmission system according to claim 3, wherein the mutually corresponding signals comprise analog and digital signals of the same channel or program.

5. Transmission system according to claim 3, wherein the mutually corresponding signals comprise standard definition and high definition signals of the same channel or program.

6. Transmission system according to claim 1, wherein the selector is arranged for selecting the at least one of the mutually corresponding signals for inclusion in a list of available channels or programs for presentation to a user, such list representing only those signals from said plurality of signals that are capable of being received or processed by said receiver.

7. Transmission system according to claim 1, wherein the selector is arranged for selecting the at least one of the mutually corresponding signals based on a quality of the received signals and a quality of reception conditions at the receiver.

8. A method of receiving at least a part of a plurality of signals, the plurality of signals comprising mutually corresponding signals, the method comprising:
  receiving at a receiver information identifying said mutually corresponding signals,
  selecting on basis of said information at least one of the mutually corresponding signals based on the capabilities of the receiver to process only said selected at least one of the mutually corresponding signals.

* * * * *